(12) United States Patent
Lin et al.

(10) Patent No.: US 11,458,478 B2
(45) Date of Patent: Oct. 4, 2022

(54) INTEGRATED STAGE FOR HOLDING RAPID TEST REAGENT CARDS

(71) Applicant: NATIONAL CHENG KUNG UNIVERSITY, Tainan (TW)

(72) Inventors: Yu-Cheng Lin, Tainan (TW); Wei-Chien Weng, Tainan (TW); Kai-Wen Lin, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 43 days.

(21) Appl. No.: 16/952,053

(22) Filed: Nov. 18, 2020

(65) Prior Publication Data

US 2022/0118457 A1   Apr. 21, 2022

(30) Foreign Application Priority Data

Oct. 21, 2020   (TW) .................................. 109136547

(51) Int. Cl.
| | | |
|---|---|---|
| *B01L 9/00* | (2006.01) | |
| *G01N 35/00* | (2006.01) | |
| *G01N 21/27* | (2006.01) | |

(52) U.S. Cl.
CPC .............. *B01L 9/52* (2013.01); *G01N 21/274* (2013.01); *G01N 35/00029* (2013.01); *B01L 2200/02* (2013.01); *B01L 2300/0858* (2013.01); *B01L 2300/123* (2013.01); *G01N 2035/00148* (2013.01)

(58) Field of Classification Search
None
See application file for complete search history.

(56) References Cited

U.S. PATENT DOCUMENTS 8,701,815 B2 *   4/2014   Polzius .............. A61B 10/0045
340/576

FOREIGN PATENT DOCUMENTS

| TW | M486769 U | 9/2014 |
| TW | M533212 U | 12/2016 |
| TW | I699703 B | 7/2020 |

* cited by examiner

*Primary Examiner* — Jyoti Nagpaul
(74) *Attorney, Agent, or Firm* — CKC & Partners Co., LLC

(57) ABSTRACT

An integrated stage for holding rapid test reagent cards includes two U-shaped sidewalls opposite to each other, a first receiving space, a second receiving space, and an elastic sheet. The U-shaped sidewalls cooperatively define the first receiving space. The second receiving space is formed in the first receiving space and is lower than the first receiving space. The elastic sheet is arranged on a short side of the first receiving space. The first receiving space is used for allowing the integrated stage to hold a first rapid test reagent card. The second receiving space is used for allowing the integrated stage to hold a second rapid test reagent card. The integrated stage utilizes the elastic sheet to hold and fix the first rapid test reagent card or the second rapid test reagent card.

10 Claims, 3 Drawing Sheets

INTEGRATED STAGE FOR HOLDING RAPID TEST REAGENT CARDS

RELATED APPLICATIONS

This application claims priority to Taiwan Application Serial Number 109136547, filed Oct. 21, 2020, the disclosures of which are incorporated herein by reference in their entireties.

BACKGROUND

Field of Invention

The present invention relates to an integrated stage for holding rapid test reagent cards. More particularly, the present invention relates to an integrated stage of an analyzing apparatus for analyzing rapid test reagent cards.

Description of Related Art

In recent years, the medical rapid test technology has become a trend. Most of the rapid test reagent cards use the naked eyes to make a qualitative detection. However, results of the said qualitative detection may be affected by the environment influences or human misjudgment.

In order to solve the above problems, one of the solutions is to utilize an analyzing apparatus using the principle of optical detection to perform a concentration analysis on the rapid test reagent card. However, the said analyzing apparatus needs to use an optical calibration card to perform an optical calibration at first, and then the said analyzing apparatus further needs to use a product information card to read product information of the rapid test reagent card, and then the rapid test reagent cards with different types are sent into the said analyzing apparatus to perform the concentration analysis. In other words, the said analyzing apparatus needs plural stages with different specification for respectively holding the optical calibration card, the product information card, and the rapid test reagent cards, such that the cost for developing the product molds of the said analyzing apparatus is increased.

SUMMARY

The present invention provides an integrated stage for holding rapid test reagent cards includes two U-shaped sidewalls opposite to each other, a first receiving space, a second receiving space, and an elastic sheet. The U-shaped sidewalls cooperatively define the first receiving space. The second receiving space is formed in the first receiving space and is lower than the first receiving space. The elastic sheet is arranged on a short side of the first receiving space. The first receiving space is used for allowing the integrated stage to hold a first rapid test reagent card. The second receiving space is used for allowing the integrated stage to hold a second rapid test reagent card. The integrated stage utilizes the elastic sheet to hold and fix the first rapid test reagent card or the second rapid test reagent card.

In accordance with one or more embodiments of the invention, the first rapid test reagent card is a rapid test reagent card with two sample inlets, and the second rapid test reagent card is a rapid test reagent card with one sample inlet.

In accordance with one or more embodiments of the invention, a width of the first receiving space is larger than a width of the second receiving space, and a length of the first receiving space is less than a length of the second receiving space.

In accordance with one or more embodiments of the invention, the integrated stage is disposed within an optical analyzing apparatus such that the optical analyzing apparatus performs a concentration analysis on the first rapid test reagent card and the second rapid test reagent card.

In accordance with one or more embodiments of the invention, the first receiving space is further used for allowing the integrated stage to hold an optical calibration card. A colorimetric pattern is printed on the optical calibration card. The optical analyzing apparatus utilizes the optical calibration card to perform an optical calibration.

In accordance with one or more embodiments of the invention, the first receiving space is further used for allowing the integrated stage to hold a product information card. A barcode corresponding to product information of the first rapid test reagent card or the second rapid test reagent card is printed on the product information card.

In accordance with one or more embodiments of the invention, a dimension of the optical calibration card is identical to a dimension of the first rapid test reagent card, and a dimension of the product information card is identical to the dimension of the first rapid test reagent card.

In accordance with one or more embodiments of the invention, an image recognition pattern is printed on each of the first rapid test reagent card and the second rapid test reagent card. The optical analyzing apparatus recognizes the image recognition pattern to determine whether the first rapid test reagent card or the second rapid test reagent card is held on the optical analyzing apparatus. The optical analyzing apparatus recognizes the image recognition pattern such that the optical analyzing apparatus sends a notification message when the first rapid test reagent card or the second rapid test reagent card is placed incorrectly.

In accordance with one or more embodiments of the invention, the said integrated stage further includes a protruding portion arranged on one of the U-shaped sidewalls. The protruding portion is used for conveniently extracting the integrated stage.

In accordance with one or more embodiments of the invention, a barcode corresponding to product information of the first rapid test reagent card is printed on a back of the first rapid test reagent card.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1A:
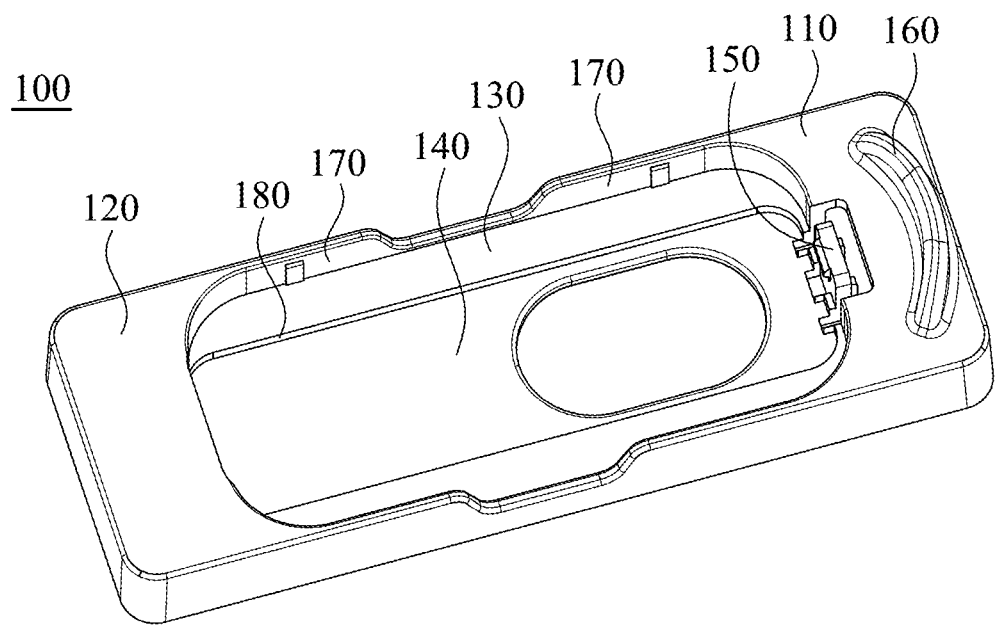
FIG. 1a and FIG. 1b illustrate three dimensional views of an integrated stage according to some embodiments of the present invention.
Figure 1B:
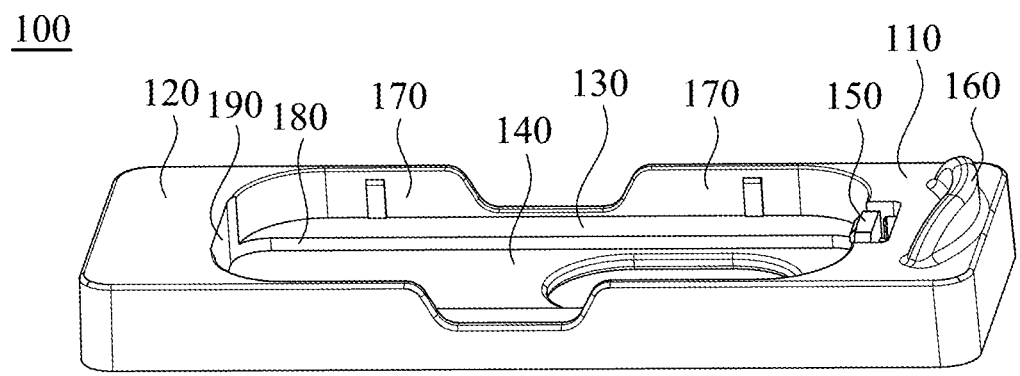

FIG. 1a and FIG. 1b illustrate three dimensional views of an integrated stage 100 according to some embodiments of the present invention. FIG. 1a and FIG. 1b represent three dimensional views of an integrated stage 100 with different viewing angles. The integrated stage 100 is used for holding rapid test reagent cards. The integrated stage 100 includes two U-shaped sidewalls 110 and 120 opposite to each other, a first receiving space 130, a second receiving space 140, and an elastic sheet 150. The U-shaped sidewalls 110 and 120 cooperatively define the first receiving space 130. The second receiving space 140 is formed in the first receiving space 130. The elastic sheet 150 is arranged on one of two short sides of the first receiving space 130.

As shown in FIG. 1a and FIG. 1b, a height of a bottom surface of the second receiving space 140 is lower than a height of a bottom surface of the first receiving space 130, and a width of the first receiving space 130 is larger than a width of the second receiving space 140, and a length of the first receiving space 130 is less than a length of the second receiving space 140.

Figure 2:
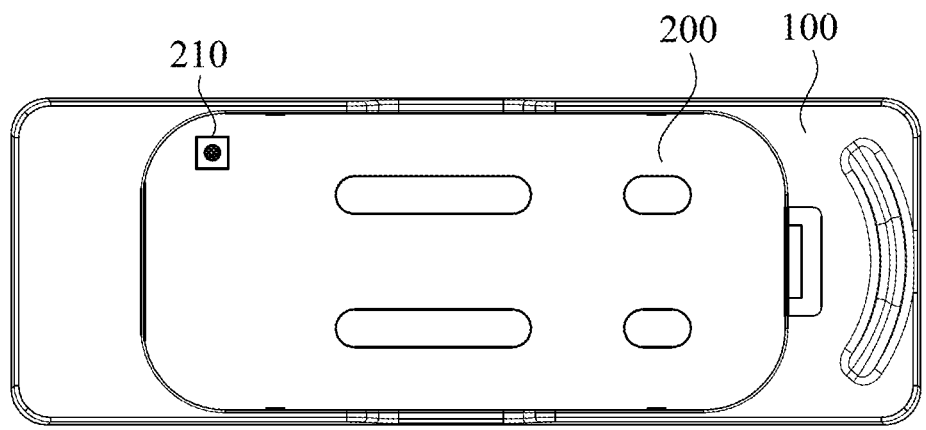
FIG. 2 illustrates a diagram showing that the integrated stage holds a first rapid test reagent card according to some embodiments of the present invention.

FIG. 2 illustrates a diagram showing that the integrated stage 100 holds a first rapid test reagent card 200 according to some embodiments of the present invention. As shown in FIG. 1a, FIG. 1b, and FIG. 2, the first receiving space 130 of the integrated stage 100 is used for allowing the integrated stage 100 to hold the first rapid test reagent card 200. In detail, the integrated stage 100 utilizes a sidewall 170 and the elastic sheet 150 to hold and fix the first rapid test reagent card 200. In some embodiments of the present invention, the first rapid test reagent card 200 is a rapid test reagent card with two sample inlets.

Figure 3:
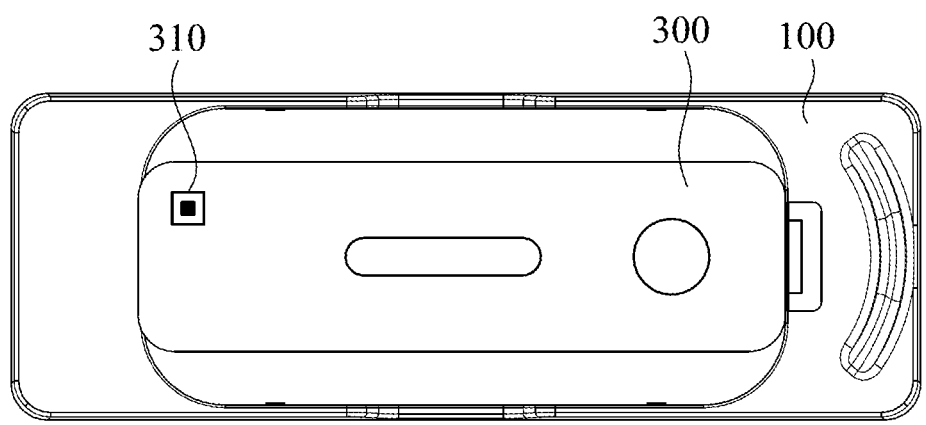
FIG. 3 illustrates a diagram showing that the integrated stage holds a second rapid test reagent card according to some embodiments of the present invention.

FIG. 3 illustrates a diagram showing that the integrated stage 100 holds a second rapid test reagent card 300 according to some embodiments of the present invention. As shown in FIG. 1a, FIG. 1b, and FIG. 3, the second receiving space 140 of the integrated stage 100 is used for allowing the integrated stage 100 to hold the second rapid test reagent card 300. In detail, the integrated stage 100 utilizes two sidewalls 180 and 190 and the elastic sheet 150 to hold and fix the second rapid test reagent card 300. It is worth mentioning that when the integrated stage 100 holds the first rapid test reagent card 200, the first rapid test reagent card 200 would not contact the sidewall 190 because the length of the first receiving space 130 is less than the length of the second receiving space 140. In some embodiments of the present invention, the second rapid test reagent card 300 is a rapid test reagent card with one sample inlet.

Specifically, because a width of the rapid test reagent card with two sample inlets is larger than a width of the rapid test reagent card with one sample inlet and a length of the rapid test reagent card with two sample inlets is less than a length of the rapid test reagent card with one sample inlet, the integrated stage 100 of the present invention is correspondingly designed such that the width of the first receiving space 130 is larger than the width of the second receiving space 140 and the length of the first receiving space 130 is less than the length of the second receiving space 140.

In some embodiments of the present invention, the integrated stage 100 is disposed within an optical analyzing apparatus (not shown) such that the optical analyzing apparatus utilizes the principle of optical detection to perform a concentration analysis on the first rapid test reagent card 200 and the second rapid test reagent card 300. It is noted that the content of the said optical analyzing apparatus and/or the said principle of optical detection should already be known to those skilled in the art, and are therefore not described in further detail herein.

Accordingly, the optical analyzing apparatus does not need two stages with two different specifications so as to respectively hold the first rapid test reagent card 200 and the second rapid test reagent card 300. Specifically, the integrated stage 100 of the present invention is configured to hold the first rapid test reagent card 200 and the integrated stage 100 of the present invention is also configured to hold the second rapid test reagent card 300, and therefore the integrated stage 100 of the present invention could save the cost for developing the product molds of the optical analyzing apparatus.

As shown in FIG. 2 and FIG. 3, an image recognition pattern 210 is printed on the first rapid test reagent card 200 and an image recognition pattern 310 is printed on the second rapid test reagent card 300. Accordingly, the optical analyzing apparatus could utilize the image recognition manner such that the optical analyzing apparatus determines that the integrated stage 100 holds the first rapid test reagent card 200 by recognizing the image recognition pattern 210, and the optical analyzing apparatus could utilize the image recognition manner such that the optical analyzing apparatus determines that the integrated stage 100 holds the second rapid test reagent card 300 by recognizing the image recognition pattern 310. Furthermore, when the image recognition pattern 210 and the image recognition pattern 310 are not recognized by the optical analyzing apparatus, the optical analyzing apparatus determines that the user has inserted the wrong rapid test reagent card such that the optical analyzing apparatus sends a notification message to notify the user that the wrong rapid test reagent card is inserted. On the other hand, the optical analyzing apparatus could also utilize the image recognition manner to recognize the image recognition pattern 210 and the image recognition pattern 310 so as to send a notification message when the first rapid test reagent card 200 or the second rapid test reagent card 300 is placed incorrectly (e.g., first rapid test reagent card 200 or the second rapid test reagent card 300 is placed in the opposite direction), such that the optical analyzing apparatus notifies the user to reposition the first rapid test reagent card 200 or the second rapid test reagent card 300, thereby realizing mistake proofing. It is noted that the placement position, the pattern, and the quantity of each of the image recognition pattern 210 and the image recognition pattern 310 as shown in FIG. 2 and FIG. 3 are merely used to exemplarily illustrate one of the implementation of the present invention, and the present invention is not limited thereto. Those skilled in the art may adjust the placement position, the pattern, and/or the quantity of each of the image recognition pattern 210 and the image recognition pattern 310 according to the actual demand.

As shown in FIG. 1a and FIG. 1b, the integrated stage 100 further includes a protruding portion 160 arranged on the U-shaped sidewall 110. When the integrated stage 100 is disposed within the optical analyzing apparatus, the protruding portion 160 faces outward and is exposed from the optical analyzing apparatus. The protruding portion 160 is used for conveniently extracting the integrated stage 100 from the optical analyzing apparatus.

Figure 4:
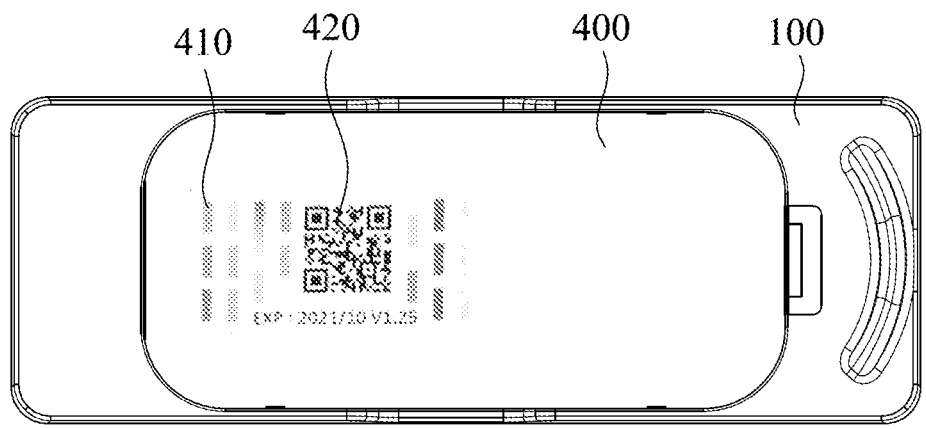
FIG. 4 illustrates a diagram showing that the integrated stage holds an optical calibration card according to some embodiments of the present invention.

In some embodiment of the present invention, the optical analyzing apparatus needs to perform an optical calibration after the optical analyzing apparatus is turned on. FIG. 4 illustrates a diagram showing that the integrated stage 100 holds an optical calibration card 400 according to some embodiments of the present invention. As shown in FIG. 4, the first receiving space 130 of the integrated stage 100 is further used for allowing the integrated stage 100 to hold the optical calibration card 400. A colorimetric pattern 410 and a quick response code (QR code) 420 are printed on the optical calibration card 400. It is noted that although the colorimetric pattern 410 shown in FIG. 4 is presented in black-and-white color, however the colorimetric pattern 410 is actually a color pattern. The QR code 420 includes an expiration date of the optical calibration card 400 and an anti-forgery code. The optical analyzing apparatus utilizes the QR code 420 to determine whether the colorimetric pattern 410 is usable. The optical analyzing apparatus utilizes the colorimetric pattern 410 printed on the optical calibration card 400 to perform the optical calibration.

Specifically, because the first receiving space 130 is configured to hold the first rapid test reagent card 200 (i.e., the rapid test reagent card with two sample inlets) and the first receiving space 130 is also configured to hold the optical calibration card 400, the optical calibration card 400 is designed such that a dimension of the optical calibration card 400 is identical to a dimension of the first rapid test reagent card 200.

Figure 5:
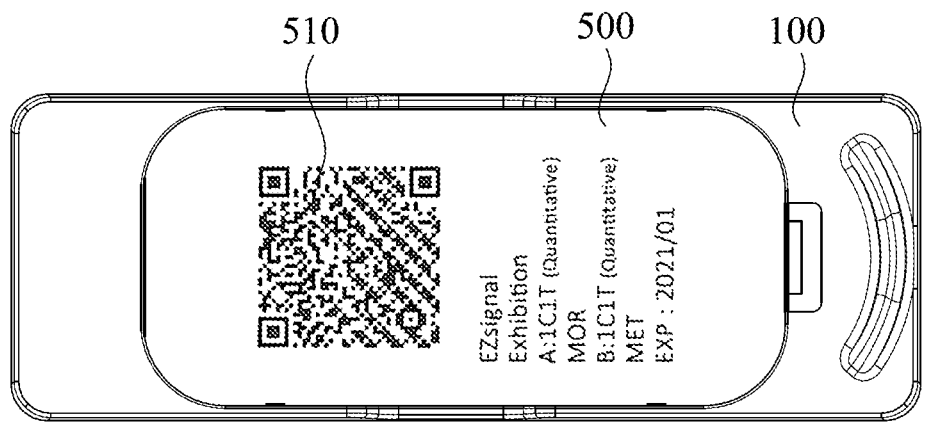
FIG. 5 illustrates a diagram showing that the integrated stage holds a product information card according to some embodiments of the present invention.

In some embodiments of the present invention, before the optical analyzing apparatus performs the concentration analysis on the first rapid test reagent card 200 and the second rapid test reagent card 300, the optical analyzing apparatus needs to read product information of the first rapid test reagent card 200 and the second rapid test reagent card 300. FIG. 5 illustrates a diagram showing that the integrated stage 100 holds a product information card 500 according to some embodiments of the present invention. As shown in FIG. 5, the first receiving space 130 of the integrated stage 100 is further used for allowing the integrated stage 100 to hold the product information card 500. A QR code 510 corresponding to product information of the first rapid test reagent card 200 or the second rapid test reagent card 300 is printed on the product information card 500. The optical analyzing apparatus utilizes the QR code 510 printed on the product information card 500 to read the product information of the first rapid test reagent card 200 or the second rapid test reagent card 300.

Specifically, if the optical analyzing apparatus would like to perform the concentration analysis on the first rapid test reagent card 200, the QR code 510 printed on the product information card 500 corresponds to the product information of the first rapid test reagent card 200. Specifically, if the optical analyzing apparatus would like to perform the concentration analysis on the second rapid test reagent card 300, the QR code 510 printed on the product information card 500 corresponds to the product information of the second rapid test reagent card 300. In other words, the optical analyzing apparatus utilizes the QR code 510 printed on the product information card 500 to know that the concentration analysis is performed on the first rapid test reagent card 200 or the second rapid test reagent card 300, such that the optical analyzing apparatus correspondingly adjusts the related parameters corresponding to the detection standard, and therefore the optical analyzing apparatus could perform the concentration analysis correctly.

In some embodiments of the present invention, the optical calibration card 400 is printed with the QR code 420 including the expiration date of the optical calibration card 400 and an anti-forgery code and the product information card 500 is printed with the QR code 510 including the product information, but the present invention is not limited thereto. The optical calibration card 400 could be printed with a barcode (linear barcode) including the expiration date of the optical calibration card 400 and an anti-forgery code and the product information card 500 could be printed with a barcode (linear barcode) including the product information.

Specifically, because the first receiving space 130 is configured to hold the first rapid test reagent card 200 (i.e., the rapid test reagent card with two sample inlets) and the first receiving space 130 is also configured to hold the product information card 500, the product information card 500 is designed such that a dimension of the product information card 500 is identical to a dimension of the first rapid test reagent card 200.

Accordingly, the optical analyzing apparatus does not need four stages with four different specifications so as to respectively hold the first rapid test reagent card 200, the second rapid test reagent card 300, the optical calibration card 400, and the product information card 500. Specifically, the integrated stage 100 of the present invention is configured to hold the first rapid test reagent card 200, and the integrated stage 100 of the present invention is also configured to hold the second rapid test reagent card 300, and the integrated stage 100 of the present invention is also configured to hold the optical calibration card 400, and the integrated stage 100 of the present invention is also configured to hold the product information card 500, and therefore the integrated stage 100 of the present invention could save the cost for developing the product molds of the optical analyzing apparatus.

In some other embodiments of the present invention, the QR code including the product information of the first rapid test reagent card 200 could be printed on a back of the first rapid test reagent card 200. In other words, if the optical analyzing apparatus would like to perform the concentration analysis on the first rapid test reagent card 200, the first rapid test reagent card 200 with the back printed with the QR code including the product information is turned over to make the back upward, such that the optical analyzing apparatus reads the product information of the first rapid test reagent card 200, and then, the first rapid test reagent card 200 is turned over to make the front side upward, such that the optical analyzing apparatus performs the concentration analysis on the first rapid test reagent card 200. It is worth mentioning that the aforementioned manner of printing the QR code on the back of the first rapid test reagent card is merely an alternative solution. In practice, in order to reduce the production burden of the manufacturer and make the convenient operation so that the user would not easy to be confused, the main implementation of the present invention is to make the first rapid test reagent card 200, the second rapid test reagent card 300, the optical calibration card 400, and the product information card 500 to be divided into four independent cards.

From the above description, the present invention provides an integrated stage such that the optical analyzing apparatus does not need several stages with several different specifications so as to respectively hold the rapid test reagent cards with different functions, the optical calibration card, and the product information card. The integrated stage of the present invention could save the cost for developing the product molds.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An integrated stage for holding rapid test reagent cards, comprising:
    two U-shaped sidewalls opposite to each other;
    a first receiving space, wherein the U-shaped sidewalls cooperatively define the first receiving space;
    a second receiving space formed in the first receiving space, wherein the second receiving space is lower than the first receiving space; and
    an elastic sheet arranged on a short side of the first receiving space;
    wherein the first receiving space is used for allowing the integrated stage to hold a first rapid test reagent card;
    wherein the second receiving space is used for allowing the integrated stage to hold a second rapid test reagent card;
    wherein the integrated stage utilizes the elastic sheet to hold and fix the first rapid test reagent card or the second rapid test reagent card;
    wherein a width of the first receiving space is larger than a width of the second receiving space, wherein a width of the first rapid test reagent card is larger than a width of the second rapid test reagent card.

2. The integrated stage of claim 1, wherein the first rapid test reagent card is a rapid test reagent card with two sample inlets, wherein the second rapid test reagent card is a rapid test reagent card with one sample inlet.

3. The integrated stage of claim 1, wherein a width of the first receiving space is larger than a width of the second receiving space, wherein a length of the first receiving space is less than a length of the second receiving space.

4. The integrated stage of claim 1, wherein the integrated stage is disposed within an optical analyzing apparatus such that the optical analyzing apparatus performs a concentration analysis on the first rapid test reagent card and the second rapid test reagent card.

5. The integrated stage of claim 4, wherein the first receiving space is further used for allowing the integrated stage to hold an optical calibration card, wherein a colorimetric pattern is printed on the optical calibration card, wherein the optical analyzing apparatus utilizes the optical calibration card to perform an optical calibration.

6. The integrated stage of claim 5, wherein the first receiving space is further used for allowing the integrated stage to hold a product information card, wherein a barcode corresponding to product information of the first rapid test reagent card or the second rapid test reagent card is printed on the product information card.

7. The integrated stage of claim 6, wherein a dimension of the optical calibration card is identical to a dimension of the first rapid test reagent card, wherein a dimension of the product information card is identical to the dimension of the first rapid test reagent card.

8. The integrated stage of claim 4, wherein an image recognition pattern is printed on each of the first rapid test reagent card and the second rapid test reagent card, wherein the optical analyzing apparatus recognizes the image recognition pattern to determine whether the first rapid test reagent card or the second rapid test reagent card is held on the optical analyzing apparatus, wherein the optical analyzing apparatus recognizes the image recognition pattern such that the optical analyzing apparatus sends a notification message when the first rapid test reagent card or the second rapid test reagent card is placed incorrectly.

9. The integrated stage of claim 1, further comprising:
    a protruding portion arranged on one of the U-shaped sidewalls, wherein the protruding portion is used for conveniently extracting the integrated stage.

10. The integrated stage of claim 1, wherein a barcode corresponding to product information of the first rapid test reagent card is printed on a back of the first rapid test reagent card.

* * * * *